US006494614B1

(12) United States Patent
Bennett et al.

(10) Patent No.: US 6,494,614 B1
(45) Date of Patent: Dec. 17, 2002

(54) LAMINATED MICROCHANNEL DEVICES, MIXING UNITS AND METHOD OF MAKING SAME

(75) Inventors: Wendy D. Bennett, Kennewick; Donald J. Hammerstrom, West Richland; Peter M. Martin; Dean W. Matson, both of Kennewick, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/399,821

(22) Filed: Sep. 21, 1999

Related U.S. Application Data

(63) Continuation-in-part of application No. 09/123,780, filed on Jul. 27, 1998.

(51) Int. Cl.$^7$ ............................ B01L 3/00; B01F 13/00; B01D 65/00; B01D 67/00
(52) U.S. Cl. ........................ 366/336; 366/341; 422/100; 422/68.1; 210/321.84
(58) Field of Search .................... 366/336–340, 366/341; 156/256; 204/600, 450, 451, 601; 422/100, 102, 68.1; 428/178, 188, 172; 216/2, 56; 210/321.84, 500.25, 634, 511

(56) References Cited

U.S. PATENT DOCUMENTS

| 4,124,478 A | * 11/1978 | Tsien et al. ................ 204/255 |
| 4,869,849 A | 9/1989 | Hirose et al. ............... 261/78.2 |
| 5,016,707 A | * 5/1991 | Nguyen ....................... 165/167 |
| 5,209,906 A | 5/1993 | Watkins et al. ............. 422/200 |
| 5,385,712 A | 1/1995 | Sprunk ........................ 422/190 |
| 5,534,328 A | 7/1996 | Ashmead et al. ........... 428/166 |
| 5,595,712 A | * 1/1997 | Harbster et al. ............ 422/129 |
| 5,611,214 A | 3/1997 | Wegeng et al. .............. 62/498 |
| 5,681,484 A | * 10/1997 | Zanzucchi et al. ............ 216/2 |
| 5,811,062 A | 9/1998 | Wegeng et al. ............. 422/129 |
| 5,849,208 A | * 12/1998 | Hayes et al. ................. 216/94 |
| 6,082,185 A | * 7/2000 | Saaski ....................... 73/64.56 |
| 6,126,804 A | * 10/2000 | Andresen .................... 204/601 |
| 6,129,973 A | * 10/2000 | Martin et al. ............... 428/166 |
| 6,210,514 B1 | * 4/2001 | Cheung et al. ............. 156/241 |

OTHER PUBLICATIONS

Martin et al., "Laser Micromachined and laminated microchannel components for chemical sensors and heat transfer applications," in Micromachined Devices and Components III, Society of Photo–Optical Instrumentation Engineers, Bellingham, WA (1997).

"Fabrication of plastic microfluidic components," Microfluidic Devices and Systems, SPIE vol. 3515, pp. 172–173, 1998.

"Microfluidic devices for $\mu$–TAS applications fabricated by polymer hot embossing," SPIE vol. 3515, pp. 177–182, 1998.

* cited by examiner

Primary Examiner—Tony G Soohoo
(74) Attorney, Agent, or Firm—Stephen R. May; Frank S. Rosenberg

(57) ABSTRACT

A laminated microchannel device is described in which there is a unit operation process layer that has longitudinal channel. The longitudinal channel is cut completely through the layer in which the unit process operation resides. Both the device structure and method of making the device provide significant advantages in terms of simplicity and efficiency. A static mixing unit that can be incorporated in the laminated microchannel device is also described.

16 Claims, 4 Drawing Sheets

RESERVOIRS — 12, 14
INLET PORTS — 16, 18

⊙ ⊙ — 20

⊙ ⊙ — 22

PUMP 1 — 30
⊙ ⊙

⊙ ⊙
PUMP 2 — 32
25 — ⊙ ⊙ — 24
27 — ⊙ ⊙ — 28

LAMINATED MICROCHANNEL DEVICES, MIXING UNITS AND METHOD OF MAKING SAME

RELATED U.S. APPLICATION DATA

This is a continuation-in-part of U.S. patent application Ser. No. 09/123,780 filed Jul. 27, 1998.

This invention was made with Government support under Contract DE-AC0676RLO 1830 awarded by the U.S. Department of Energy. The Government has certain rights in the invention.

FIELD OF THE INVENTION

The present invention relates to laminated microchannel devices, static mixing units, and methods of making same.

BACKGROUND OF THE INVENTION

The desires to reduce costs and increase efficiency have been important factors in promoting advances in modern technology. One technique to reduce the costs of devices is to produce the devices automatically and in large quantities. This technique, known as mass production, was a key to making the automobile widely available. Another common technique to reduce costs is to minaturize devices. A well known example of minaturization is in the computer industry, where computers that formerly occupied entire rooms can now be made the size of a wristwatch. Minaturization saves both space and materials.

Furthermore, the reduction of size, in theory, can increase the efficiency of processes such as heat transfer. Scientists and engineers at Pacific Northwest National Laboratory have been at the forefront of efforts to minaturize fluid-containing systems. The success of these efforts can be seen in the microcomponent systems described by Wegeng et al. in U.S. Pat. Nos. 5,611,214 and 5,811,062. These patents describe microcomponent sheet architecture that can be used in a wide variety of devices including heat exchangers, fuel processing units, chemical separators, and chemical processing.

Other minaturized chemical reactors, sometimes called "reactor-on-a-chip technology", are formed on a single layer, usually silicon. An example of a multilayer chemical reactor is described by Ashmead et al. in U.S. Pat. No. 5,534,328. In column 3 of the patent, Ashmead et al. suggest various materials and state that the laminae can be processed by selected subtractive, additive, and forming processes. At column 6, lines 55–60, Ashmead et al. state that their invention preferably uses materials of groups III, IV, and V of the Periodic Table, most preferably silicon and germanium. In the "Method Of Fabrication" section of the patent, the desposition and etching of silicon and silicon compounds is described.

Methods for forming complex microstructures in silicon are well-known and have found applicability in making microfluidic devices. It would be desirable to form microfluidic devices from plastic. Plastic is cheap, light-weight, durable, and resistant to many chemicals. However, unlike silicon, methods for creating complex microstructures in plastic are not well-established, nor are these methods necessarily amenable to low cost, mass production. Becker et al. in "Microfluidic devices for $\mu$-TAS applications fabricated by polymer hot embossing," describe methods of hot embossing polymer substrates using a heated master material. Becker et al. state that, when silicon was used as the master material, their technique required very tight control over the deembossing process because very small shear stresses could break the fine silicon structures. Becker et al. also state that embossing vertical walls requires high quality embossing tools since any surface defect in the tool is replicated in polymer and that the tool remains in contact with the structured surface during deembossing and slight deformations on the channel edge can be observed due to the frictional forces.

Despite prior efforts at miniturizing microfluidic devices, there remains a need for microchannel devices that can be made by new, inexpensive methods of mass production. There is also a need for multilayer, plastic microchannel devices. There is a corresponding need for new methods of making microchannel devices, especially methods for making plastic and/or multilayer devices.

SUMMARY OF THE INVENTION

The present invention provides a laminated microchannel device containing at least a unit operation process layer, and first and second channel containment layers. The unit operation process layer has an inlet and a channel that extends longitudinally through the process layer. The channel is cut through the entire layer, including top and bottom surfaces. One of the channel containment layers forms the top and bottom cover layer. Fluid communication into the inlet and out of the outlet is provided via fluid passages through either or both of the channel containment layers. The surface area of the channel's inlets and outlets preferably make up less than about 20%, and more preferably less than 10% of the channel's total surface area.

The invention also provides a method of making a laminated microchannel device in which the channel containment layers and the unit operation process layer are stacked together in a laminated device.

In another aspect of the invention, a static mixing unit is provided. The mixing unit has an inlet adapted to convey a first fluid into a central channel. The central channel has sides and an outlet. The mixing unit also has an outer channel having a second inlet adapted to convey a second fluid into the outer channel. The outer channel is disposed around the central channel and at least two connecting channels extend between the outer channel and the central channel and thus provide fluid communication between the outer and central channel. The mixing unit is especially well adapted for insertion in a laminated microchannel device.

The inventive microchannel device and methods provide numerous advantages over the prior art. These advantages include simplicity, rapid construction, and excellent suitability to low cost mass production. The static mixing unit provides intimate mixing of fluid streams without the presence of moving parts. The mixing unit is especially well suited for inclusion in a laminated microchannel device where this novel design provides efficient fluid transport and essentially instantaneous mixing of multiple fluid streams; thus providing an intimately mixed product stream to a subsequent unit process operation layer.

The subject matter of the present invention is particularly pointed out and distinctly claimed in the concluding portion of this specification. However, both the organization and method of operation, together with further advantages and objects thereof, may best be understood by reference to the following drawings and description.

GLOSSARY

"Unit operation process layer" means that an entire process, such as mixing, is conducted within a single layer, i.e., the unit process does not extend through several layers of a laminated device.

"Lamina" means a single sheet of material.

"Layer" can include a lamina, adhesive layers and parts of upper and lower laminae.

Elements that are in "fluid communication" means that fluid can flow between the elements. In preferred embodiments, an outlet of one element is directly adjacent the inlet of another element.

A "channel" in the microchannel device refers to a channel having a length at least five times greater than the width, and where the channel width is less than 20% of the sheet width.

A "channel containment layer" is defined in combination with a unit process operation layer, and the channel containment layer blocks at least a portion of the through-cut channel in the unit process operation layer. For example, the channel containment layer can be a cover layer or a second process layer whose channel or channels only overlap with the first unit process operation layer at the inlet and/or outlet.

A "fluid passage" is a through hole, channel or other passage that allows fluid flow therethrough.

A "microgroove" is a groove (on the micrometer scale) that is cut only part way through a layer.

DESCRIPTION OF PREFERRED EMBODIMENTS

Figure 1:
FIG. 1 is an elevated view of each layer of a plastic laminated microchannel device. Pumps, inlet ports, and reservoirs are illustrated schematically.
Figure 1:
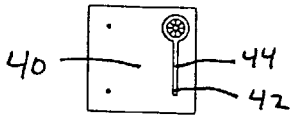
Figure 1:
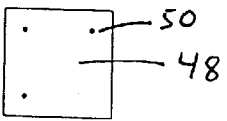
Figure 1:
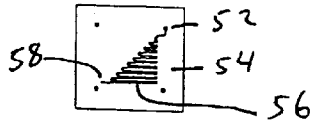
Figure 1:
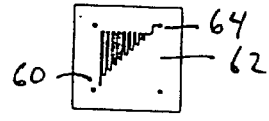
Figure 1:
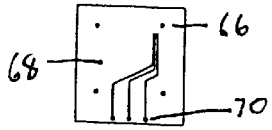
Figure 1:
Figure 1:
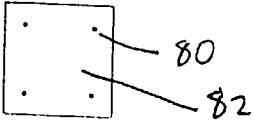

Preferred embodiments of the laminated microchannel device are discussed below with reference to FIGS. 1 and 2, which are discussed in a top-down fashion.

Reservoirs 12, 14 contain fluids that are to be passed through the microchannel device. For microanalysis, the reservoirs could be syringes—one of which holds an analyte, such as contaminated ground water, another syringe holding a reactant whose reaction product can be conveniently measured by a microdetector. In another alternative, where the microchannel device is used as a microreactor, the reservoirs could be conduits that transport fluids from containers holding chemical reactants. Although only two reservoirs are shown, numerous reservoirs can be used in the inventive device.

The reservoirs can be connected to inlet ports 16, 18 which are sized to channel fluids from the reservoirs to the pumps. In some embodiments, the inlet ports are integral with the reservoirs.

Gaskets 20, 22 can be used to seal the inlet ports to the pumps. The gaskets are preferably an elastic material, such as rubber, or a nonelastic material covered by an adhesive. Gaskets 24, 28 may also be used to seal the connection between the pump outlets and the inlets to the top cover sheet. Identically sized gaskets, e.g., 25, 27, are a convenient source of spacers between layers. In this context, note that the drawing in FIG. 2 schematically illustrates pumps 30, 32 as small blocks, while FIG. 1 is based on a layer-by-layer view of an actual device, described in the Example section, in which the length and breadth of each pump was greater than that of the laminate, so that a hole was drilled through Pump 2 for transporting fluid from Pump 1. This, actual, construction utilized a gasket between Pump 1 and Pump 2 and spacers to ensure that the pumps were level.

Pumps 30, 32 control the fluid flow through the device. Thus, the pumps can be set to control the amount of each fluid passed into the device. Preferred pumps are piezoelectric micropumps available from IMM (Germany, available in the U.S. through MesoSystems, Richland, Wash.) and the VAMP micropump from IMIT (Germany).

The top cover sheet 34 contains through holes 36, 38 that allow passage of fluid through the cover layer. Other than the through holes, the cover sheet is preferably an impermeable material. In the present invention fluid passages, such as through holes, can provide fluid communication with an inlet and/or outlet of the unit process operation layer. This structure is more compact and efficient than constructions in which the inlets and/or outlets are connected to fluid conduits (such as tubes) connected through an exterior side of a laminate.

Below the top cover sheet 34 may be located a unit process operation module. In the present invention, a unit process operation module is defined as a single layer within a microchannel laminated device in which a process is conducted. The area in which a process is conducted can include the adhesive layer on either side of a single lamina and, in less preferred embodiments, may include portions of the upper and lower cover layers. It is preferred that the entire unit process operation occur within a single lamina (plus adhesive on either side) since adding modifications (such as microgrooves) to the upper or lower cover sheets would add cost and complexity to the device. It is also preferred that the single process operation not occur over the space of several layers, since the multilayer construction increases size and complexity, reduces system flexibility and interchangeability of parts, and may reduce reliability (since a flaw in any layer of a multilayer unit process operation module could lead to failure). Through holes and cut out sheets that leave only a margin of material are not considered unit process operation modules as that term is used herein. As compared to a large space bounded by a margin of sheet material, the use of microchannels provides better fluid control, more consistent residence times within a layer, and since force is a function of pressure times area, less susceptibility to leakage. Nonlimiting examples of unit process operations include: mixing, reacting, detection and directional flow channels. Five unit process operation modules are illustrated in FIG. 1: a mixing module 40, a first reaction module 54, a second reaction module 62, a detector module 68, and a detector channel 76.

The inventive device contains at least one unit process operation module that has an elongate channel (i.e. a channel that runs parallel with the width and breadth of a layer (as opposed to the thickness of a layer) that is at least as thick as the lamina—i.e., the channel passes through the sheet. The mixing module 40, reaction modules 54, 62, and detector channel 76 have such a channel, while the detector module 68 does not. There are many advantages to devices that have one unit process operation module with channels that are cut completely through a lamina. For example, since the lamina thickness is very precise and consistent, the channels cut completely through the lamina will have very precise and consistent thickness, as compared to microgrooves which are subject to imprecisions and inconsistencies in the groove-forming process. Additionally, the surfaces at the top and bottom of the channel are very smooth. As compared to microgrooves with through-holes, through-cut channels are easier to align with inlets and outlets and are also less prone to clogging by particles that can lodge in through holes.

Figure 2:
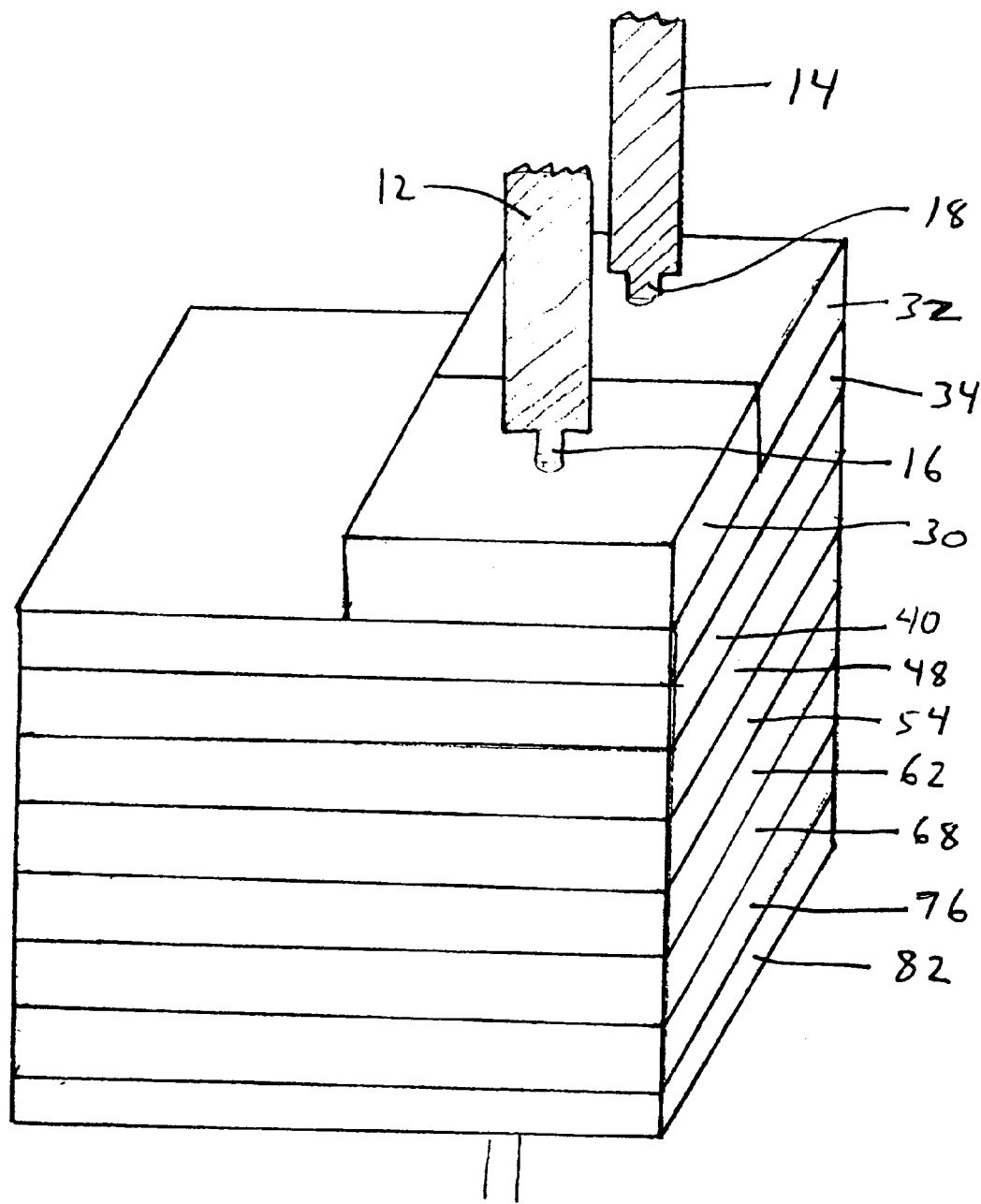
FIG. 2 is an elevated, side view of the microchannel device that can be made by laminating the layers of FIG. 1. The drawing is not scaled and some components in the drawing are illustrated schematically.
Figure 3:
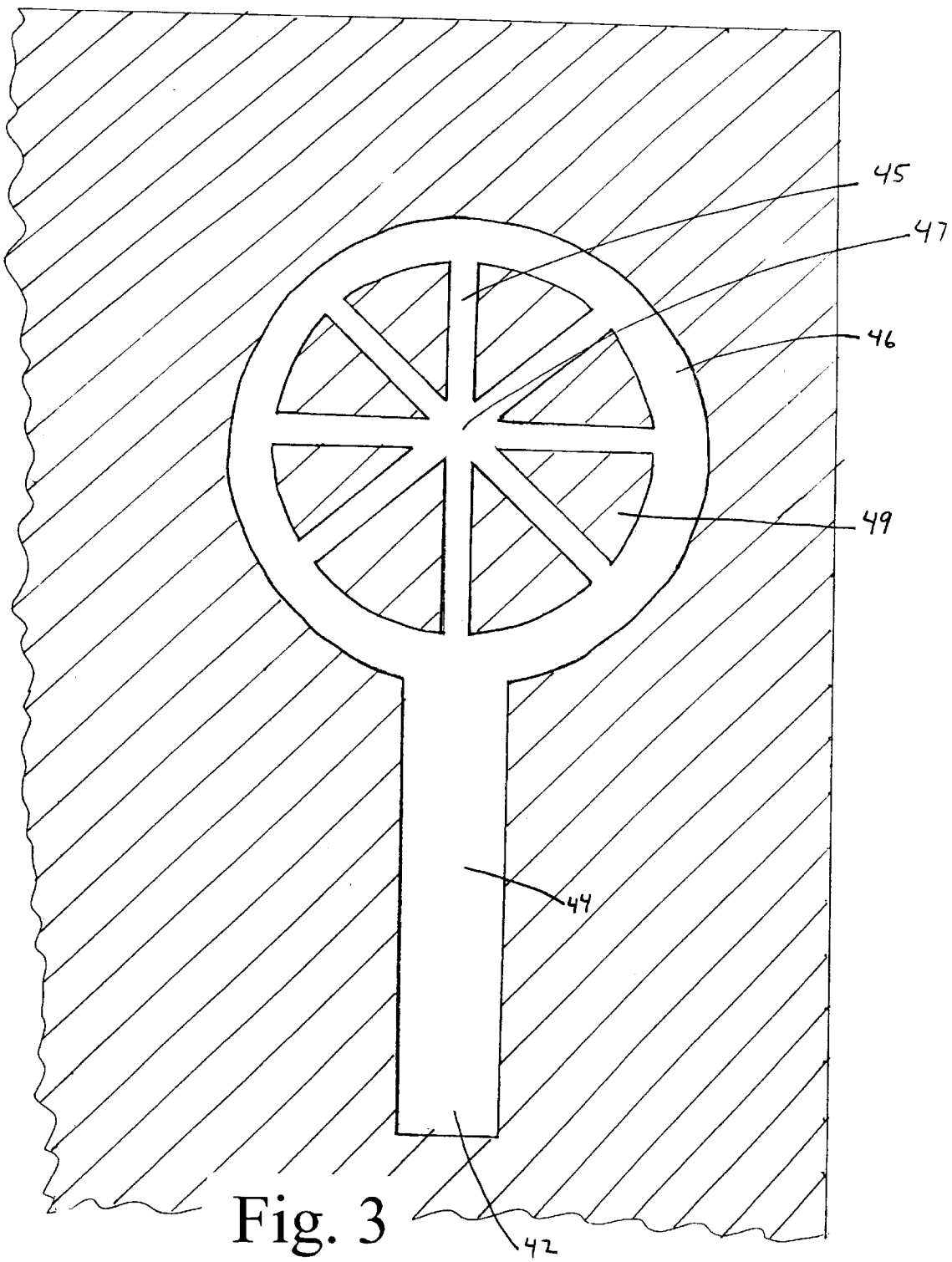
FIG. 3 is a top down view of a mixing unit of the present invention.

In the device illustrated in FIG. 1, a mixing module is located beneath the top cover layer. An enlarged, overhead view of the mixing module is shown in FIG. 3. Fluid from the second pump enters through mixing module inlet 42. There is no corresponding through hole in bottom cover layer 48, so fluid is forced along channel 44 and into and around outer channel 46. The fluid then passes through connecting channels 45 into center channel 47. Flow dividers 49 are held in place by adhesive (not shown) that coats the top and bottom of the mixing lamina and adheres the mixing lamina (including flow dividers) to the top 34 and bottom 48 cover sheets. Fluid from the first pump flows downward into through hole 36 and into center channel 47 where it is intimately mixed with fluid flowing through the connecting channels 45. The relative amounts of the first and second fluids is in direct proportion to the flow rate exiting the micropumps.

The intimate and essentially instantaneous mixing obtained with the inventive static mixing module (as well as the simple elegance of the mixing unit design) demonstrates its superiority to conventional T-mixers or serpentine mixers. Mixing units of the invention are especially well suited for use in a microchannel device such as that illustrated in FIGS. 1 and 2, but it is contemplated that the mixing unit design, such as that illustrated in FIG. 3, may also be used in other apparatus.

The mixed fluid next flows via through hole 50 in bottom cover sheet 48 and into the inlet 52 of the first reaction module 54. The first reaction module includes a through-cut, serpentine channel 56 that terminates in outlet 58. The length of the serpentine channel combined with turbulence in the channel allows for reaction while the mixed fluids pass through the reaction module. Fluid passing through outlet 58 passes immediately into the inlet 60 of the second reaction module 62. Other than the adhesive, there is no intervening layer between the first and second reaction modules. Inlet through hole 52 in the first reaction module and outlet through hole 64 in the second reaction module are offset, so that there is no direct path through the reaction modules. Except for inlet 60, the through-cut, serpentine channel of the second reaction module does not overlap with the serpentine channel of the first reaction module.

After passage through the serpentine channel of the second reaction module, the mixed, reacted fluid passes through the through hole 66 in detector module layer 68 and into the inlet 74 of the detector channel layer. The fluid then flows through detector channel 76 and passes under (but in contact with) detector pads 70 which are disposed on the bottom of the detector module. An electrical signal is generated containing information on the amounts of the analytes (such as chromium) being measured. Various types of detectors are known in the art one example of a detector for trace metals is described in "Mercury-plated iridium-based microelectrode arrays for trace metal detection by voltammerty: optimum conditions and reliability", C. Belmont, et al., nalytica Chimica Acta 329 (1996) 203–214. After passing over the detector pads, the fluid then flows out through hole 78 in the detector channel, and exits via through hole 80 in the bottom cover sheet 82.

The various layers and unit process operation modules are preferably composed of plastic. Commercially available thin plastic layers are inexpensive and durable. In contrast, commercially available silicon wafers are thicker, much more expensive, and less durable. Thin glass layers are brittle. Plastic layers are also superior due to their ability to be economically mass produced. A particularly preferred plastic material is polyimide, sold by the tradename Kapton®, available from DuPont. Kapton® sheeting comes in a variety of thicknesses (that can be selected depending on the desired channel depth) with adhesive coating on one, both or neither side. The plastic lamina are preferably bonded by an adhesive such as the acrylate or silicone adhesive that comes with Kapton® sheeting. Alternatively, the lamina could be bonded by other means such as thermal bonding, rivets, clamps, etc.

Each layer preferably has dimensions of width and breadth of less than 15 cm, more preferably between 1 and 5 cm. Each layer, containing one sheet (with adhesive, if present), preferably has a thickness of less than 200 micrometer ($\mu$m), more preferably between 10 and 100 $\mu$m. The through-cut channels typically have depths equal to the layer thickness. Excluding the reservoirs, inlets and pumps, the inventive devices can be very thin, preferably less than 0.5 cm thick, more preferably between about 0.2 mm and 20 mm thick. The through-cut channels preferably have widths of less than about 800 $\mu$m, more preferably between 100 and 250 $\mu$m. Small volumes are especially desirable because mass transport is highly efficient in small volumes.

The inventive devices are useful in a variety of applications including, but not limited to, microanalysis devices, chemical microreactors, and microdialysis units. A preferred dialysis unit of the present invention includes a semipermeable membrane sandwiched between two layers having through-cut, serpentine channels. The semipermeable membrane would allow the diffusion of selected compounds from one channel layer to the next. Because of the small channel volume and corresponding high rates of mass transport, the inventive dialysis units can operate more efficiently than conventional systems. The construction of various dialysis units is described in U.S. patent application, Ser. No. 09/123,780, now abandoned which is incorporated herein by reference as if reproduced in full below.

Because the inventive devices are capable of being produced inexpensively and in large quantities, they are capable of being used in great numbers in large scale applications. For example, as large scale chemical reactors and in dialysis systems for humans.

Laminated devices of the invention can be made by laminating precut layers. For example, a top cover layer, unit process operation module, and bottom cover layer can be laminated together. Lamination of layers can be accomplished by a variety of known methods, but is preferably conducted by pressing together lamina with an intervening adhesive layer between each pair of lamina.

Another important advantage of the present invention is the ease, speed and precision by which microchannel-containing layers, especially plastic layers, can be produced. Various machining techniques are listed in U.S. Pat. No. 5,534,328, which is incorporated herein by reference. Microchannels of the present invention are preferably cut by laser machining and stamp-cutting. In a preferred method, the microchannels are cut from adhesive-coated lamina-thus cutting through sheeting and adhesive in one step. In a more preferred method, the microchannels are formed by stamp-cutting. Stamp-cutting is a fast and inexpensive method by which the microchannel-containing layers can be mass produced. "Stamp-cutting," as that term is used herein, refers to a cutting process in which the sharp outline of a desired shape is cut into and through a lamina and the unwanted cut portion is removed (i.e., it is a subtractive process) and not a forming process in which a shape or other form is stamped into a substrate. Kiss-cutting is an especially preferred method of the present invention. In kiss-cutting a laminate, some lamina are cut through while other lamina are not. Stamp-cutting and kiss-cutting are preferred over methods such as hot embossing because in hot embossing the plastic material tends to ooze out from the embossed groove leaving uneven surfaces. Also, stamp-cutting and kiss-cutting do not require the input of heat energy—thus saving energy and avoiding plastic deformation. Stamp-cutting and kiss-cutting are only made possible by the inventive design in which microchannels are cut through a lamina.

Adhesive-coated sheeting typically comes with release paper coating the adhesive. The release paper can be removed just prior to lamination, leaving a freshly exposed adhesive surface. In a preferred method, a kiss-cut is made through a lamina and through adhesive layer(s) but not through the release layer, and the release layer with cut-out sections is stripped off, leaving the patterned lamina with patterned adhesive. The laminae may be degassed by heating in a vacuum oven prior to or after stacking. This process softens the adhesive (but not the sheet material) and removes any trapped air bubbles. The stacked modules may then be pressed to further enhance bonding. It has been discovered that heating to about 70° C. and pressing is sufficient to fill voids in the adhesive, but does not fill in the channels and did not impede flow through the device.

EXAMPLE

A microchannel device was produced having the layers illustrated in FIG. 1. The reservoirs were syringes. The inlet ports consisted of two tapered holes, sized to accommodate syringe tips, drilled in a polycarbonate block 2 cm×2 cm×0.95 cm. The micropumps were piezoelectric pumps obtained from IMIT (Germany) and modified by plugging the original side inlet and outlet ports, drilling new inlet and outlet ports in the top and bottom of each pump, and adding a polycarbonate spacer around the piezo arm to allow clearance in the stacked design.

All layers and gaskets, except the detector module, were laser micromachined using a 245 nm excimer laser micromachining system (Potomac LMT-4000 and LMT-5000) on 50 $\mu$m thick polyimide sheet (Kapton®) with 50 $\mu$m thick acrylate adhesive on one, both or neither side. The Kapton® sheeting had release paper over the adhesive layer(s). If present, the top release paper was removed, and micromachining was conducted through the Kapton® sheeting and adhesive layer, and then the release paper removed prior to lamination. Twelve 5 mm outer diameter/1 mm inner diameter gaskets were fabricated from the sheets with adhesive on both sides. The layers were 2 cm×2 cm.

The mixing module was micromachined from a sheet with adhesive on both sides. The mixing pattern consisted of a straight 800 $\mu$m wide channel connected to a circular channel with 200 $\mu$m wide spokes and an exit port in the center (see FIG. 3). Mixing ratio of the two components can be controlled by adjusting the relative pumps rates.

The mixing module was sandwiched between cover sheets made with 800 $\mu$m diameter inlet and outlet ports. The top and bottom cover sheets did not have adhesive on either side.

The reaction module consisted of two layers. The upper reaction module had adhesive only on the top side, while the lower module had adhesive on both sides. Serpentine channels were cut completely through both layers. The channels were cut such that, when stacked, the only overlap occurred at the outlet of the upper module and the inlet of the lower module. A cover layer with adhesive only on the bottom side was stacked under the lower reaction module.

Figure 4A:
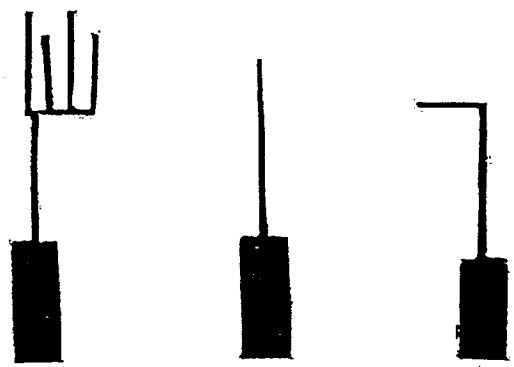
FIG. 4a is a top down view illustrating gold leads on the detector module.
Figure 4B:
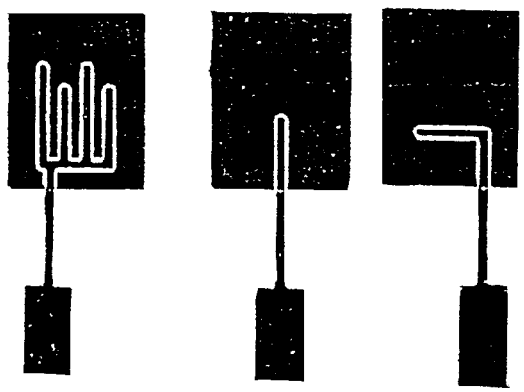
FIG. 4b is a top down view illustrating the detector module with detector pads deposited over the gold leads.
Figure 4C:
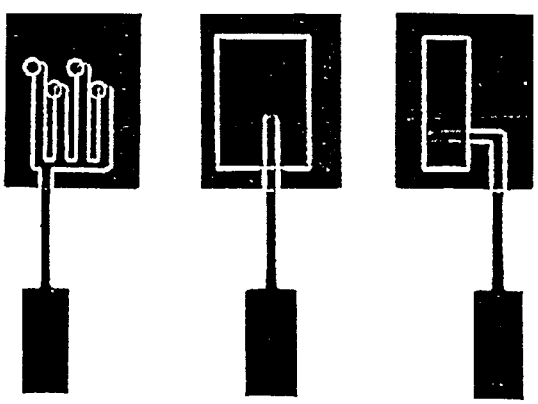
FIG. 4c is a top down view illustrating the detector module after deposition of a silicon nitride overcoat with patterned openings.

The detector module was fabricated on a 2 cm×2.2 cm×0.16 cm-thick BK7 glass (available from ESCO Products Inc.) Gold leads and iridium, gold, and silver detector pads were deposited by magnetron sputtering in the pattern illustrated in FIGS. 4a and 4b. A silicon nitride insulated layer with patterned openings was deposited by reactive magnetron sputtering in the pattern illustrated in FIG. 4c. The additional 0.2 cm width of the glass plate was provided so that the gold leads could be connected to external electronics.

The finished device, without pumps, i.e., layers 34, 40, 48, 54, 62, 68, 76, and 82 (including intervening adhesive layers) had length and breadth dimensions of 2.0×2.2 cm with a thickness of 0.25 cm.

CLOSURE

While some preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A laminated microchannel device comprising:
 a unit operation process layer comprising
  top and bottom surfaces;
  a channel extending longitudinally through the process layer and having a depth equal to or greater than the depth of the layer such that the channel has an opening through the top and bottom surfaces of the process layer;
  an inlet in fluid communication with said channel;
  an outlet in fluid communication with said channel;
 a first channel containment layer adjacent the top or bottom surface of said channel;
 a second channel containment layer;
 a first fluid passage extending through one of said first or second channel containment layers; and
 a second fluid passage extending through one of said first or second channel containment layers;
 wherein the unit operation process layer is disposed between the first and second channel containment layers;
 wherein the first fluid passage is in fluid communication with said inlet;
 wherein the second fluid passage is in fluid communication with said outlet; and
 wherein said first channel containment layer, said unit operation process layer, and said second channel containment layer are composed of plastic.

2. The laminated microchannel device of claim 1 wherein the second channel containment layer is a cover layer adjacent said process layer.

3. The laminated microchannel device of claim 2 wherein said static mixing unit comprises:
a central channel
having an first inlet adapted to convey a first fluid into the central channel,
sides, and
an outlet;
an outer channel having a second inlet adapted to convey a second fluid into the outer channel;
wherein the outer channel is disposed around the central channel; and
at least two connecting channels extending between the outer channel and the central channel and adapted to provide fluid communication between the outer channel and the central channel.

4. The laminated microchannel device of claim 2 wherein:
the first fluid passage is a through hole extending through the first channel containment layer,
the second fluid passage is a through hole extending through the second channel containment layer; and
further comprising a second unit operation process layer that performs a process different than the first unit operation process layer;
wherein the second fluid passage is in fluid communication with an inlet of the second unit operation process layer.

5. The laminated microchannel device of claim 4 wherein the first unit operation process layer comprises a mixing unit and the second unit operation process layer comprises a reaction channel.

6. The laminated microchannel device of claim 4 wherein the second unit operation process layer comprises a detector module.

7. The laminated microchannel device of claim 6, wherein the device comprises a microanalysis device.

8. The laminated microchannel device of claim 4 wherein the first and second channel containment layers are made from a material that is impermeable to fluids.

9. The laminated microchannel device of claim 1 wherein said unit operation process layer comprises a static mixing unit.

10. The laminated microchannel device of claim 1 comprising:
a first lamina having a serpentine channel terminating in an outlet, wherein the serpentine channel extends through the top and bottom of the first lamina;
a second lamina having a serpentine channel having an inlet, wherein the serpentine channel extends through the top and bottom of the second lamina;
wherein the first and second laminae are stacked together such that the outlet of the serpentine channel of the first lamina overlaps the inlet of the serpentine channel of the second lamina, and wherein the serpentine channels of the first and second lamina do not otherwise overlap.

11. The laminated microchannel device of claim 1 further comprising a second unit operation process layer comprising
top and bottom surfaces;
a channel extending longitudinally through the process layer and having a depth equal to or greater than the depth of the layer such that the channel has an opening through the top and bottom surfaces of the process layer;
wherein the second channel containment layer is a semipermeable membrane and the device comprises a microdialysis device.

12. A method of making a laminated microchannel device comprising the steps of:

stacking a first cover layer, a unit operation process layer, and a second cover layer,
wherein the unit operation process layer comprises:
a unit operation process layer comprising
top and bottom surfaces;
a channel extending longitudinally through the process layer and having a depth equal to or greater than the depth of the layer such that the channel has an opening through the top and bottom surfaces of the process layer;
an inlet in fluid communication with said channel;
an outlet in fluid communication with said channel;
a first channel containment layer adjacent the top or bottom surface of said channel;
a second channel containment layer;
first fluid passage extending through one of said first or second channel containment layers; and
a second fluid passage extending through one of said first or second channel containment layers;
wherein the unit operation process layer is disposed between the first and second layers;
wherein the first fluid passage is in fluid communication with said inlet; and
wherein the second fluid passage is in fluid communication with said outlet.

13. The method of claim 12 wherein said first cover layer, said unit operation process layer, and said second cover layer are composed of plastic.

14. The method of claim 13 comprising the step of kiss-cutting said channel in said unit operation process layer.

15. The method of claim 14 wherein an adhesive layer is interposed between a release sheet and a plastic sheet, and a kiss-cut is made through said plastic sheet and said adhesive layer, but not through the release sheet.

16. The method of claim 15 further comprising the step of peeling off the release sheet to yield an adhesive-coated unit operation process layer.

* * * * *